US 7,793,562 B2

(12) United States Patent
Birkel et al.

(10) Patent No.: US 7,793,562 B2
(45) Date of Patent: Sep. 14, 2010

(54) TRANSMISSION AND SHIFT METHOD

(75) Inventors: Jeffrey F. Birkel, Pekin, IL (US); Stuart J. Walker, Shifnal (GB)

(73) Assignee: Caterpillar Inc, Peoria, IL (US)

( * ) Notice: Subject to any disclaimer, the term of this patent is extended or adjusted under 35 U.S.C. 154(b) by 963 days.

(21) Appl. No.: 11/148,166

(22) Filed: Jun. 9, 2005

(65) Prior Publication Data

US 2005/0274218 A1    Dec. 15, 2005

(30) Foreign Application Priority Data

Jun. 11, 2004    (GB)    ................................ 0413008.4

(51) Int. Cl.
*G05G 9/00*    (2006.01)
*F16H 63/32*    (2006.01)

(52) U.S. Cl. ................. 74/473.1; 74/473.24; 74/473.37

(58) Field of Classification Search .............. 74/473.11, 74/473.12, 473.21, 473.24, 473.25, 473.36, 74/473.37, 473.1, 335
See application file for complete search history.

(56) References Cited

U.S. PATENT DOCUMENTS

| 822,057 | A | * | 5/1906 | Krebs | ....................... 74/473.25 |
| 1,332,902 | A | * | 3/1920 | Jensen | ........................... 70/247 |
| 1,454,576 | A | * | 5/1923 | Clements | ................. 74/473.25 |
| 2,320,454 | A | * | 6/1943 | Eberhard | ................. 74/473.24 |
| 2,690,684 | A | * | 10/1954 | Stemler | .................... 74/473.24 |
| 3,049,934 | A | * | 8/1962 | Butler et al. | .................. 74/335 |
| 3,301,079 | A | * | 1/1967 | Fletcher et al. | ............... 74/333 |
| 3,387,501 | A | * | 6/1968 | Frost | ........................... 74/335 |
| 3,452,614 | A | * | 7/1969 | Conkle | .................... 74/473.26 |
| 3,581,594 | A | * | 6/1971 | Longshore | ............... 74/473.26 |
| 3,834,499 | A | * | 9/1974 | Candellero et al. | ............ 477/73 |
| 4,120,212 | A | | 10/1978 | Philipsen | |
| 4,359,910 | A | * | 11/1982 | Numazawa et al. | ...... 74/473.24 |
| 4,445,393 | A | * | 5/1984 | Braun | ........................ 74/346 |
| 4,539,447 | A | | 9/1985 | Mizutani et al. | |
| 4,633,729 | A | * | 1/1987 | Scalisi et al. | ............. 74/473.24 |

(Continued)

FOREIGN PATENT DOCUMENTS

DE    10336971 B3  *  10/2004

(Continued)

OTHER PUBLICATIONS

PCT International Search Report; PCT/US2005/020284, Filing Date: Sep. 6, 2005, Applicant: Turner Powertrain Systems Limited, Mailing Date: Dec. 21, 2006.

(Continued)

*Primary Examiner*—Thomas R Hannon
*Assistant Examiner*—Phillip A Johnson
(74) *Attorney, Agent, or Firm*—Finnegan, Henderson, Farabow, Garrett & Dunner LLC

(57) ABSTRACT

Transmissions in which the mechanical gear shift arrangements are replaced by electro-hydraulic operated shift mechanisms that have to be able to be neutralised positively to ensure a proper operation. An arrangement and method are provided to determine the position of the shift rail so a shift can be made only if the conditions are right. To prevent engagement of two shift members at the same time and consequent damage in case of electronic failure, mechanical safety features such as detents are included.

15 Claims, 3 Drawing Sheets

U.S. PATENT DOCUMENTS

| | | | |
|---|---|---|---|
| 4,676,115 A * | 6/1987 | Morscheck et al. | 74/339 |
| 4,722,237 A * | 2/1988 | McNinch, Jr. | 74/346 |
| 4,726,250 A * | 2/1988 | Reed, Jr. | 74/473.24 |
| 4,793,378 A * | 12/1988 | Loeffler et al. | 137/560 |
| 4,856,362 A * | 8/1989 | Jester | 74/473.24 |
| 4,892,001 A * | 1/1990 | Meyers et al. | 74/473.25 |
| 5,038,627 A * | 8/1991 | Schwaiger et al. | 74/335 |
| 5,191,806 A | 3/1993 | De Silvestri | |
| RE34,260 E * | 5/1993 | Markyvech et al. | 74/335 |
| 5,309,787 A * | 5/1994 | Soyka et al. | 74/527 |
| 5,487,318 A * | 1/1996 | Schott | 74/606 R |
| 5,660,080 A * | 8/1997 | Rector et al. | 74/473.12 |
| 5,722,706 A * | 3/1998 | Bartel et al. | 292/216 |
| 5,816,101 A | 10/1998 | Weston | |
| 6,000,294 A * | 12/1999 | Jackson et al. | 74/335 |
| 6,027,426 A | 2/2000 | Holman | |
| 6,116,391 A | 9/2000 | Kremmling et al. | |
| 6,257,084 B1 | 7/2001 | Yoshina et al. | |
| 6,301,984 B1 | 10/2001 | Petzold | |
| 6,397,698 B1 * | 6/2002 | Kamiya et al. | 74/473.11 |
| 6,739,211 B2 * | 5/2004 | Yamamoto et al. | 74/335 |
| 6,745,878 B1 * | 6/2004 | Jensen | 192/3.63 |
| 6,755,091 B2 * | 6/2004 | Adomeit et al. | 74/335 |
| 6,935,204 B2 * | 8/2005 | Walker et al. | 74/335 |
| 2002/0088292 A1 * | 7/2002 | Berger et al. | 74/422 |
| 2002/0096008 A1 * | 7/2002 | Yamamoto | 74/473.12 |

FOREIGN PATENT DOCUMENTS

| | | |
|---|---|---|
| EP | 0 170 630 | 2/1986 |
| EP | 0170630 | 2/1986 |
| EP | 0 331 278 | 9/1989 |
| EP | 0331278 | 9/1989 |

OTHER PUBLICATIONS

Office Action mailed Mar. 28, 2008 by the People's Republic of China State Intellectual Property Office in Application No. 200580018952.5 (7 pages).

Office Action mailed Nov. 22, 2007 by U.K. Intellectual Property Office in Application GB0413008.4 (3 pages).

* cited by examiner

TRANSMISSION AND SHIFT METHOD

TECHNICAL FIELD

The present disclosure relates to the field of automated manual transmissions. More specifically but not exclusively the present invention relates to an automated manual transmission and a method of controlling at least part of the gearshifts of an automated manual transmission.

BACKGROUND

Conventional manual transmissions use gearshift systems whereby the driver manually selects the desired gear by shifting a gear stick into a certain position in the gearbox. The gear stick is in direct connection with an internal shift mechanism usually comprising some form of shift rails, shift forks and shift collars. One disadvantage of such a system is that the gearbox and the gear stick have to be arranged in such a configuration that all components can easily be interconnected by a mechanical linkage. To allow for a more flexible installation, systems have been developed wherein the mechanical linkage has been replaced by a system wherein electro-hydraulic solenoids direct oil to and from pistons mounted at the end of the shift rails to control the position of the shift rail. A well known problem associated with such a system is the locating and securing of this shift mechanism in a neutral position. The positive neutralisation of a mechanism is essential to prevent erroneous gear engagement and multiple gear sets being engaged simultaneously. A failure to do so could result in uncontrolled machine behaviour and severe mechanical damage. Previous arrangements, such as for example the 5-speed Power Synchro gearbox of Turner Powertrain, Wolverhampton, UK, utilise a multiple piston set-up whereby a set of compound pistons operate on hydraulic principles to neutralise the shift rail. This arrangement has certain disadvantages such as the complexity of the components and machining procedures and hence cost.

It is an aim of the present invention to solve one or more of the problems set forth above.

SUMMARY OF THE INVENTION

It is an object of the present disclosure to provide a gearshift arrangement with a first and a second shift member as part of respectively a first and second mechanism. The arrangement further has a sensing arrangement adapted to monitor the position of the first shift member relative to a neutral position and an actuating arrangement operable to position the first shift member into the neutral position based on at least one signal from the sensing arrangement. A mechanical arrangement is included and is adapted to prevent movement of the second shift member if the first shift member is not in a neutral position.

A second object of the disclosure is to provide a method of operating a gearshift arrangement having a first and a second shift member as part of respectively a first and second shift mechanism. The method includes the steps of electronically determining the position to a neutral position of the first shift member, positioning the first shift member into a neutral position based on at least one determination from the previous step and mechanically preventing movement of the second shift member if the first shift member is not in the neutral position.

DETAILED DESCRIPTION

Figure 1:
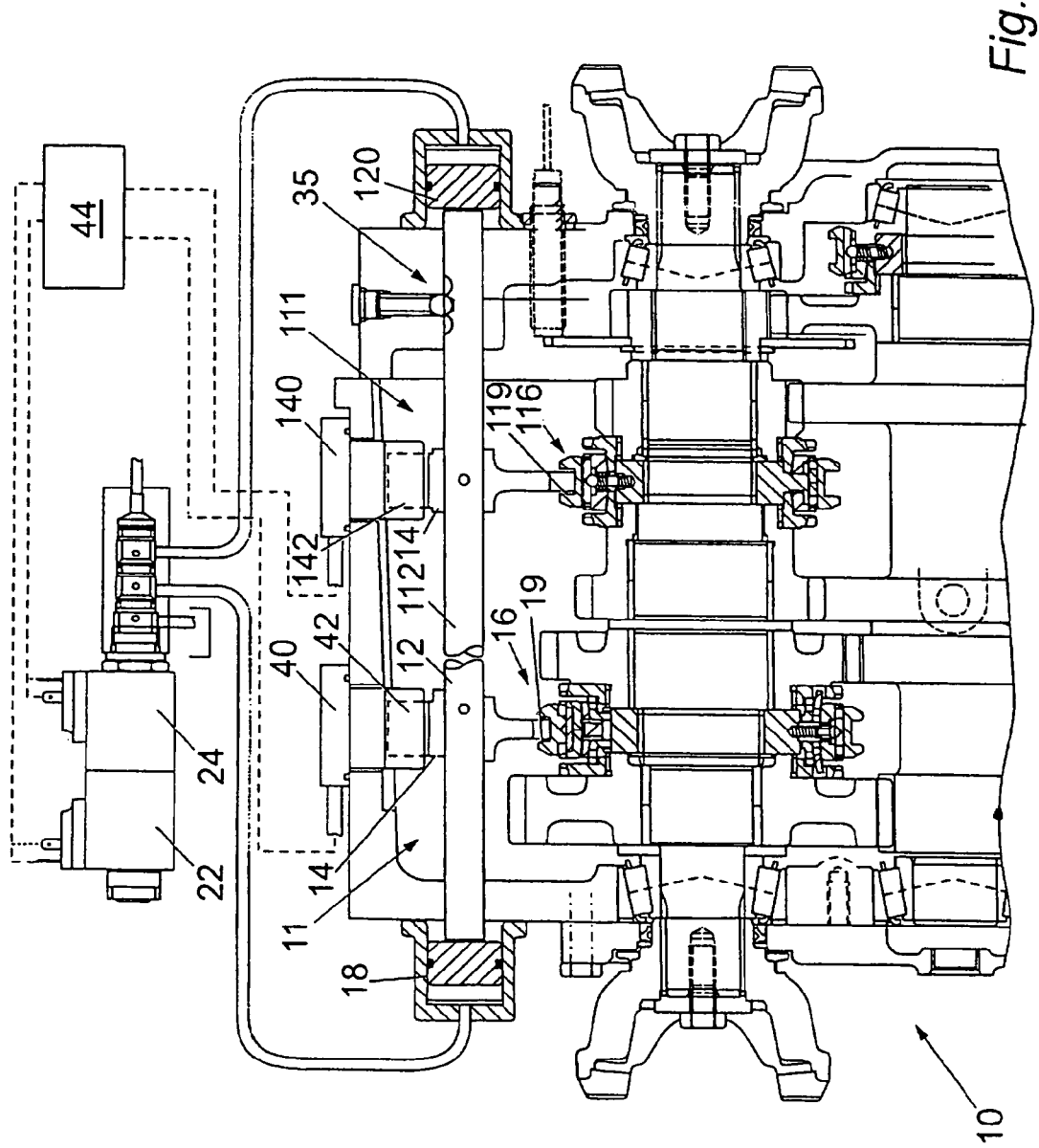
FIG. 1 is a schematic vertical section through a gearbox according to the present invention.
Figure 2:
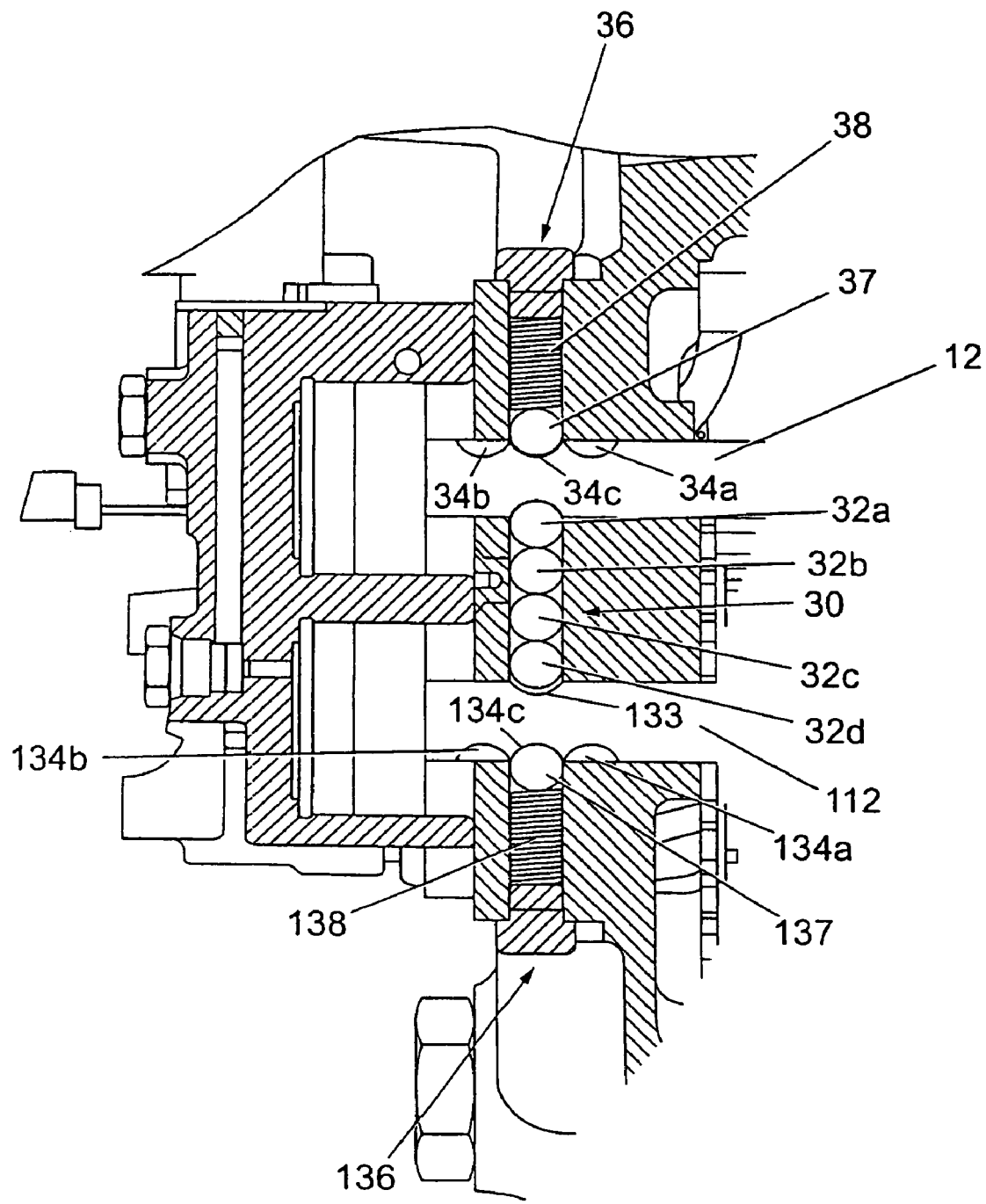
FIG. 2 is a schematic cross sectional view of a detent mechanism which may be used in the gearbox of FIG. 1.

Referring to FIGS. 1 and 2, gearbox 10 has a first shift mechanism 11 for the engagement of first and second gear and a second shift mechanism 111 for the engagement of third and fourth gear. More gears and/or gear mechanisms may be added. For simplicity, as both first shift mechanism 11 and second shift mechanism 111 are substantially similar, only shift mechanism 11 will be described in detail. Like numbers in first shift mechanism 11 and second shift mechanism 111 indicate like structures.

Figure 3A:
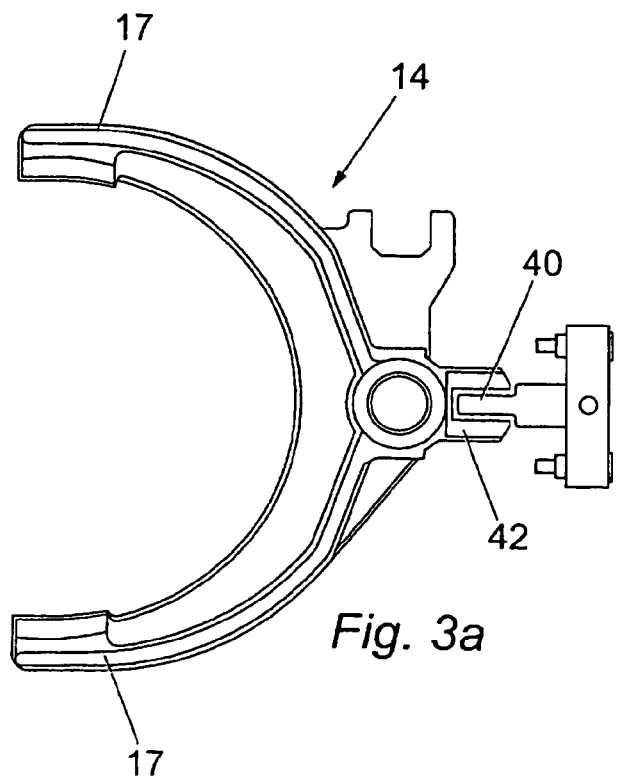
FIGS. 3a, 3b and 3c are schematic views of a shift fork as used in the gearbox of FIG. 1.
Figure 3B:
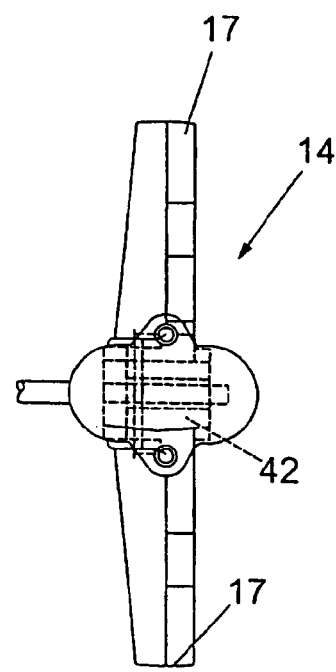
Figure 3C:
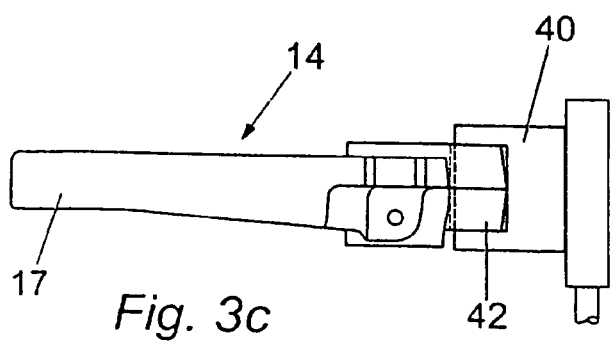

The first shift mechanism includes three shift members, namely a shift rail 12, a shift collar 16 and a shift fork 14. Shift fork 14 is rigidly connected to shift rail 12, but is in a floating engagement with shift collar 16. FIGS. 3a-3c shows shift fork 14 with two prongs 17 that engage with a counterpart such as circumferential groove 19 on shift collar 16. Although in this example shift fork 14 is of the two prong type and engages shift collar 16 via groove 19 in a floating fashion, the principle is applicable to other types of shift fork and collar arrangements. Shift collar 16 is for this disclosure considered to include the actual gear engagement clutch, for example a synchroniser clutch.

Connected to opposite ends of shift rail 12 are single acting pistons 18 and 20 (20 is not shown, 120 is shown instead) as part of an actuating arrangement 21. However one dual acting piston (not shown) may be used instead of two single acting pistons 18 and 20 if preferred. Pistons 18 and 20 may be pressurised by a fluid such as air or like in this case oil, the oil flow being generated by a pump (not shown) and directed to and from pistons 18 and 20 by solenoid valves 22 and 24 respectively. Alternatively, shift rail 12 may be actuated by an electronic solenoid (not shown) rather than an electro-hydraulic system. Other electro-hydraulic solenoid arrangements may also be possible, whereby one or multiple electro-hydraulic solenoids may operate together with directional valves or mechanical linkages to simplify the system or reduce the number of components or cost.

Specifically now referring to FIG. 2, interlocking device 30 is in this example a kind of detent arrangement with a series of balls 32a, 32b, 32c and 32d, preferably made of metal, of which balls 32a and 32d at both extremes of the series each may engage with a recesses 33 and 133 in shift rails 12 and 112. Recesses 33 and 133 in shift rails 12 and 112 are located on the rails in a position corresponding to neutral positions when the recess is lined up with the corresponding balls 32a or 32d. A neutral position for shift rails 12 and 112 is defined as the position in which shift collars 16 and 116 are in a position where no gears are engaged or being engaged. The overall length of the series of balls 32a-d is greater than the distance between the two near-most outer surfaces of shift rails 12 and 112. This prevents in normal operation the engagement of a multiple of any of 1st, 2nd, 3rd and 4th gears.

A different number of balls such as 32a-d or different arrangements having cylindrical or other shapes or non-metal components may be used.

Shift rail 12 further has a series of adjacent recesses 34a, 34b and 34c, substantially similar to shift rail 112 with recesses 134a, 134b and 134c. This is the same principle for both shift rails, so for simplicity only shift rails 12 with recesses 34a-c will be discussed in the following paragraph. Recesses 34a-c may engage with a detent mechanism such as ball 37 and spring 38 to define three discrete positions as part of a mechanical arrangement 36. The first position may correspond to shift mechanism 11 engaging first gear. The second position may correspond to shift mechanism 11 being in a neutral position, whilst the third position may correspond to shift mechanism 11 engaging second gear. The biased detent aids in locating shift rails 12 into any of the three positions and keeping it in that position. Ball 37 is preferably made of metal, but other materials as well as other shapes may be used. FIG. 1 shows a variation 35 of this detent mechanism, whereby the principle is the same, but the position of the mechanism is different.

Furthermore there are sensing arrangements 39 and 139. Again for simplicity only one such arrangement is discussed here, because the principles and components are substantially similar for both shift mechanisms 11 and 111. Sensor 40 may be fitted to a location in gearbox 10, or for ease of servicing external whilst at least partially protruding through a wall of gearbox 10. The sensing part is preferably located in a position adjacent to shift fork 14, because sensor 40 is responsive to activator 42 which is either fitted to or an integral part of shift fork 14. One possible type of sensor and activator arrangement is a non-contact linear position sensor together with a ferrous activator. The sensor may for example be a blade sensor as manufactured by Gill Technology, Lymington, Hampshire, UK. Sensor 40 is preferably a proportional and adjustable sensor to give a wider range of detection and to enable a calibration procedure. However, other suitable sensing arrangements may be used, for example contact sensors. If some type of activator is required it may also be fitted in a different position, for example on the shift rail or the shift collar. As shift rail 12, shift fork 14 and shift collar 16 all have fixed relative positions to one another, it is not significant which component is used for activation of the sensor, because in normal operation the positions of all other components may be determined once one has been sensed.

The signal generated by sensor 40 is sent preferably to an electronic control unit (ECU) 44. ECU 44 may be programmed to monitor and control a wide variety of transmission and other functions, but is able to process the signal sent from sensor 40. ECU 44 further may receive an input from for example a vehicle driver and may process the signals to then send a signal to control solenoid valves 22 and 24. An alternative may be to have a system without ECU 44, wherein solenoid valves 22 and 24 are activated directly or indirectly by signals from sensor 40 or a multiplicity of similar sensors. ECU 44 may be able to control both shift mechanisms 11 and 111.

INDUSTRIAL APPLICABILITY

During normal operation gearbox 10 and hence shift mechanisms 11 and 111 may be in a neutral position. The vehicle driver selects a desired gear, which is signaled to ECU 44. ECU 44 further receives signals from sensors 40 and 140. If all parameters are acceptable ECU 44 may activate one of solenoid valves 22, 24, 122 and 124 to direct a flow of oil from a pump (not shown) onto one of pistons 18, 20, 118 and 120 to shift one of shift mechanisms 11 and 111. The oil pressure acting on the piston may during a shift be varied by for example the solenoid valve to give smooth gear engagement and disengagement.

For example, the vehicle driver wishes to engage first gear from neutral. Via an input device his selection is signalled to ECU 44. ECU 44 has also detected the neutral positions of shift mechanisms 11 and 111 via sensors 40 and 140. If all conditions are met, ECU 44 sends a signal to solenoid valve 24 to direct oil from a pump (not shown) to piston 20 and a signal to solenoid valve 22 to create a return connection for the oil displaced by piston 18. The oil acting on piston 20 moves shift rail 12 and hence shift collar 16 to a position wherein shift collar 16 engages first gear. Once the gearshift is completed both solenoid valves 22 and 24 open up the oil connection from pistons 18 and 20 to a return line, so all pistons are depressurised. During this shift the oil pressure acting on piston 18 has to be high enough to overcome the resistance of the actual gear engagement and to lift ball 37 out of recess 34b. Once first gear engagement is completed or near completion, ball 37 engages with recess 34c. Because shift rail 12 is in an out of neutral position, interlocking device 30 prevents shift rail 112 from movement as ball 32d is now firmly engaged with recess 133.

If the driver decides to shift to a gear that can only be engaged by shift mechanism 112, for example 3rd gear, the following actions will take place. Before shift mechanism 112 can be activated, shift mechanism 12 has to be put into the neutral position. Under normal operating conditions, ECU 44 will not activate shift mechanism 112 before it receives a signal from sensor 40 that shift mechanism 12 is in the neutral position. However, in case that an electronic failure or error happens and ECU 44 attempts to engage shift mechanisms 12 and 112 simultaneously, interlocking mechanism 30 prevents this from happening. This mechanical interlocking feature is extremely important to avoid serious damage to gearbox 10. To neutralise shift mechanism 12, ECU 44 signals solenoid valve 22 to direct oil onto piston 18 and solenoid valve 24 to create a return connection for the oil displaced by piston 20. Shift rail 12 will then move towards the neutral position. Activator 42 is continuously sensed by sensor 40 which signals to ECU 44 a signal corresponding to the position of 42 and hence shift mechanism 11. Once shift rail 12 is close to reaching the neutral position, ECU 44 may signal solenoid valve 22 to reduce the flow of oil to piston 18 to reduce the speed of shift rail 12 and so prevent an overshoot condition wherein shift rail 12 passes the neutral position. When shift rail 12 is substantially in the neutral condition, ECU 44 may signal one or both solenoid valves 22 and 24 to stop all flow to and from pistons 18 and 20. In approximately the same period detent mechanism 36 engages with recess 34b to aid shift rail 12 to settle in the neutral position and to give positive retention of shift rail 12 in that neutral position.

Because of both shift rails 12 and 112 now being in the neutral position, neither of shift rails 12 and 112 are prevented from movement by interlocking device 30.

The following step is where shift mechanism 112 has to engage $3^{rd}$ gear. ECU 44 receives or has received a signal from sensor 40 about the neutral position of shift rail 12. ECU 44 signals solenoid valve 124 to direct oil onto piston 120 and solenoid valve 122 to open a return connection for the oil displaced by piston 118. The remainder of the shift is substantially similar as the engagement of first gear as described in paragraph 17 onwards. Although some of the steps as described have to be performed in a certain order, this is not essential for all steps. Also some of the steps may at least partially overlap.

What is claimed is:

1. A gearshift arrangement comprising:
   a first shift member including a first shift rail and a first shift fork connected to the first shift rail;
   a second shift member including a second shift rail and a second shift fork connected to the second shift rail;
   a single hydraulic piston located at a first end of the first shift rail and being configured to move the first shift member in only a first direction;
   a single hydraulic piston located at a second end of the first shift rail and being configured to move the first shift member in only a second direction;
   a sensing arrangement adapted to monitor the position of the first shift member relative to a neutral position, the sensing arrangement including a non-contact position sensor and a ferrous activator;
   a mechanical arrangement operable to prevent movement of the second shift member if the first shift member is not in the neutral position, and operable to prevent movement of the first shift member if the second shift member is not in the neutral position,
   wherein the ferrous activator is integrally formed as an extension of the shift fork.

2. A gearshift arrangement according to claim 1, wherein the sensing arrangement includes an electronic control unit.

3. A gearshift arrangement according to claim 1, further including
   an electro-hydraulic valve adapted to control a supply of oil acting on the single hydraulic piston located at the first end of the first shift rail and acting on the single hydraulic piston located at the second end of the first shift rail.

4. A gearshift arrangement according to claim 1, wherein the mechanical arrangement includes a detent mechanism adapted to engage with each of the first and second shift members.

5. A gearshift arrangement according to claim 1, further including a detent mechanism associated with each of the first and second shift members, and a plurality of recesses in each of the first and second shift members, each recess configured to cooperate with the detent mechanism, and wherein each recess corresponds to one of an engagement position of a gear and a neutral position.

6. A gearshift arrangement according to claim 1, further including:
   a second sensing arrangement configured to monitor the position of the second shift member relative to a neutral position;
   a single hydraulic piston located at a first end of the second shift rail and being configured to move the second shift member in only the first direction;
   a single hydraulic piston located at a second end of the second shift rail and being configured to move the second shift member in only the second direction; and
   a detent mechanism associated with one of the first and second shift members and configured to engage the one of the first and seconds shift members in a position corresponding to one of an engagement position of a gear and a neutral position.

7. A gearshift arrangement according to claim 1, wherein the mechanical arrangement includes an interlocking mechanism having a series of balls and is configured to permit one ball of the series of balls to engage with a recess in the first shift member and to permit another ball of the series of balls to engage with a recess in the second shift member.

8. The gearshift arrangement according to claim 1, wherein the ferrous activator has a fork shape configured to receive a protrusion of the non-contact position sensor.

9. The gearshift arrangement of according to claim 8, wherein the protrusion extends in an axial direction of the first shift rail.

10. The gearshift arrangement according to claim 9, wherein the ferrous activator is configured to move in an axial direction of the first shift rail, and the non-contact position sensor is configured to detect an axial position of the first shift rail.

11. A gearshift arrangement comprising:
    a first shift member forming part of a first shift mechanism;
    a second shift member forming part of a second shift mechanism;
    a first sensing arrangement configured to monitor the position of the first shift member relative to a neutral position, the first sensing arrangement including a first non-contact position sensor and a first ferrous activator;
    a second sensing arrangement configured to monitor the position of the second shift member relative to a neutral position, the second sensing arrangement including a second non-contact position sensor and a second ferrous activator;
    a first actuator configured to position the first shift member into the neutral position based on at least one signal from the first sensing arrangement;
    a second actuator configured to position the second shift member into the neutral position based on at least one signal from the second sensing arrangement; and
    a mechanical arrangement configured to prevent movement of the second shift member if the first shift member is not in neutral position, and configured to prevent movement of the first shift member if the second shift member is not in neutral position,
    wherein:
    the mechanical arrangement includes an interlocking mechanism, and the interlocking mechanism includes a series of balls;
    the mechanical arrangement is configured to permit one ball of the series of balls to engage with a recess in the first shift member, and is configured to permit another ball of the series of balls to engage with a recess in the second shift member;
    the first shift member includes a first shift fork and the first ferrous activator is incorporated in the first shift fork; and
    the second shift member includes a second shift fork and the second ferrous activator is incorporated in the second shift fork.

12. The gearshift arrangement of claim 11, including:
    a detent mechanism associated with each of the first and second shift members, and a plurality of recesses in each of the first and second shift members, each recess configured to cooperate with the detent mechanism, and wherein each recess corresponds to one of an engagement position of a gear and a neutral position.

13. The gearshift arrangement according to claim 11, wherein the ferrous activator has a fork shape configured to receive a protrusion of the non-contact position sensor.

14. The gearshift arrangement of according to claim 13, wherein the protrusion extends in an axial direction of the first shift member.

15. The gearshift arrangement according to claim 14, wherein the ferrous activator is configured to move in an axial direction of the first shift member, and the non-contact position sensor is configured to detect an axial position of the first shift member.

* * * * *